Dec. 7, 1971  R. W. EULER  3,625,113

HYDRAULIC BRAKE BOOSTER

Filed Aug. 24, 1970

INVENTOR.
RICHARD W. EULER
BY
Ken C. Decker
ATTORNEY

_United States Patent Office_

3,625,113
Patented Dec. 7, 1971

3,625,113
HYDRAULIC BRAKE BOOSTER
Richard W. Euler, South Bend, Ind., assignor to
The Bendix Corporation
Filed Aug. 24, 1970, Ser. No. 66,296
Int. Cl. F15b 13/10
U.S. Cl. 91—391                                9 Claims

ABSTRACT OF THE DISCLOSURE

A hydraulic boost device is disclosed which includes a housing defining a bore therewithin, and a piston slidable in the bore. A valve is provided within the housing that communicates pressurized fluid into the bore for shifting the piston to assist the vehicle operator when the brakes of the vehicle are applied. The piston includes a pair of relatively movable portions. One of the portions is provided with fluid passages extending therethrough that communicate fluid through the piston from one end of the bore to the other end of the bore. The other portion of the piston is yieldably biased towards a position closing the passages so that when fluid pressure is admitted to the bore the piston shifts as a unit. Operator-actuated means are provided to operate the valve. However, if the valve malfunctions, the operator-actuated means engages the piston so that the brakes of the vehicle may be applied manually. When this occurs, one portion of the piston is moved relative to the other portion of the piston to open the passages and thereby permit fluid communication through the piston. This feature prevents an abrupt application of the brakes should the valve resume functioning after a manual brake application has been initiated.

BACKGROUND OF THE INVENTION

This invention relates to a hydraulic boost device for use in the braking system of an automotive vehicle.

Because of their smaller size and lower weight, hydraulic brake boosters are expected to be used in lieu of a vacuum booster in vehicles having power-assisted brakes. Such a device is disclosed in U.S. patent application 793,923, filed Jan. 16, 1969, owned by the assignee of the present invention and incorporated herein by reference. This unit utilizes the pressurized fluid produced by the power steering pump of the vehicle to provide a hydraulic assist to the vehicle operator when the brakes are applied. The device disclosed in the aforementioned application permits manual actuation of the brakes should the supply of pressurized fluid to the unit be terminated or should a malfunction in the valve mechanism fail to communicate fluid into the unit. When the valve mechanism malfunctions, the valve sometimes resumes normal operation after the brakes have been partially applied manually. When this occurs, the vehicle stops abruptly, often damaging the vehicle and injuring its passengers.

SUMMARY OF THE INVENTION

Therefore, an important object of my invention is to prevent the brake booster from abruptly applying the vehicle's brakes if the valve mechanism suddenly resumes normal operation after a manual brake application has been initiated.

Another important object of my invention is to prevent the fluid which escapes through the seals surrounding the piston from escaping entirely from the vehicle's hydraulic system.

DETAILED DESCRIPTION

Figure 1:
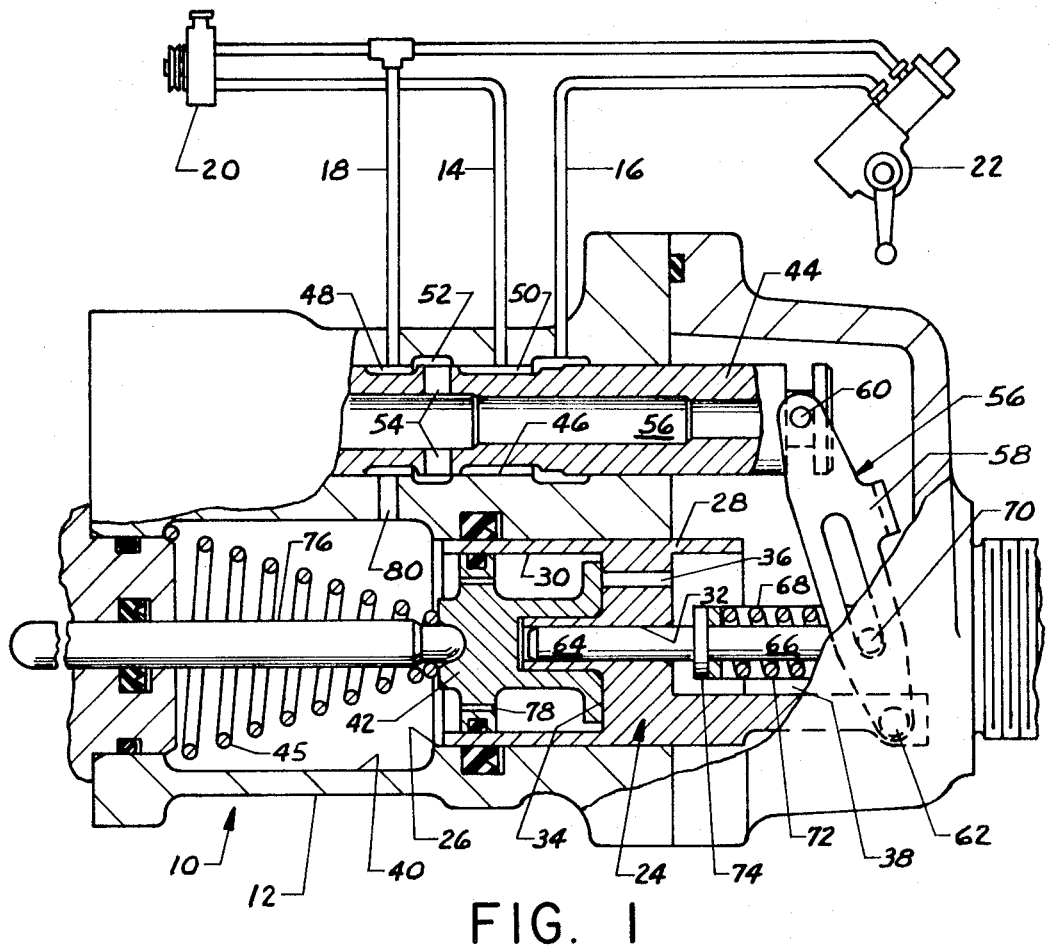
FIG. 1 is a schematic view of a vehicle hydraulic system with a brake booster made pursuant to my present invention illustrated in cross-section.

Referring now to the drawings a brake booster 10 includes a housing 12 having an inlet port 14, an outlet port 16, and a return or exhaust port 18. The inlet port 14 is communicated with the high pressure side of a standard power steering pump 20, and the outlet port 16 is communicated with the inlet port of a power steering gear 22. A standard fluid reservoir (not shown) is provided at the low pressure side of the power steering pump 20. The exhaust port 18 is communicated with this reservoir, as is the outlet of the power steering gear 22.

A boost piston 24 is slidable in a longitudinal bore 26 within the housing 12. The piston 24 includes an annular portion 28 which is provided with a stepped bore therewithin having a larger diameter portion 30 and a smaller diameter portion 32 with a shoulder 34 therebetween. Fluid passage means 36 extends through the shoulder 34 and is adapted to communicate fluid from the compartment 38 to the right of the piston 24 into the compartment 40 to the left of the piston 24. Piston assembly 24 further includes a second portion 42 which is slidably mounted in the larger diameter portion 30 of the annular portion 28. One end of the portion 42 normally engages the shoulder 34 in order to close the fluid passages 36. A rod 76 connects the other end of the portion 42 with a fluid generating means or master cylinder (not shown) mounted on the left side of the housing 12 viewing FIG. 1. Movement of the piston assembly 24 to the left develops pressure in the master cylinder in the usual manner to apply the vehicle's brakes. A spring 44 urges the portion 42 into engagement with the shoulder 34 and then urges the piston assembly 24 as a unit to the right viewing FIG. 1, toward the brake released position.

A spool valve 44 is slidably mounted in an elongated compartment 46 which communicates the ports 14, 16 and 18 with one another and with the chamber 38. The spool valve 44 is provided with spaced recesses that cooperate with the walls of the compartment 46 to define a first cavity 48 in fluid communication with the exhaust port 18 and a second cavity 50 which communicates with the inlet port 14. Cavity 48 is also communicated with the chamber 40 by a passage 80. Another cavity 52 is communicated to the chamber 38 by radially extending passages 54 and longitudinally extending passage 56. When the various parts of the brake booster 10 are disposed in the brake released position as illustrated in FIG. 1, the cavity 52 is communicated to the cavity 48, thereby venting the chamber 38 to the reservoir through the exhaust port 18. However, during a brake application the spool valve 44 is shifted to the left viewing the figure to communicate the cavity 50 with the cavity 52 to permit flow of pressurized fluid into the chamber 38 to shift the piston 24. Simultaneously, of course, fluid communication between the cavity 52 and the cavity 48 is terminated. Details of the construction and operation of the spool valve 48 are more completely described in the aforementioned application Ser. No. 793,923 and in U.S. patent application Ser. No. 13,415, filed Feb. 24, 1970, owned by the assignee of the present invention, and incorporated herein by reference.

The spool valve 44 is operated by operator-actuated mechanism generally indicated at 56. Mechanism 56 includes lever means 58 which is pivotally connected to the spool valve 44 as at 60 and to the piston 24 as at 62. One end 64 of the operator-actuated rod 66 is slidably received within the smaller diameter portion 32 of the piston 24, the other end of the rod 66 is connected to the usual brake pedal (not shown) mounted in the operator's compartment of the vehicle. An annular caging member 68 is pivotally connected to the lever means 58 as at 70. A spring 72 yieldably biases the caging member 68 into engagement with an abutment 74 on the rod 66. Details of the construction and operation of the operator-actuated mechanism 56 are more completely described in co-pending patent application Ser. No. 35,800, filed May 8, 1970, owned by the assignee of the present invention and incorporated herein by reference.

MODE OF OPERATION

When the vehicle operator depresses the brake pedal the control rod 66 is urged to the left viewing FIG. 1. Assuming normal operation of the booster mechanism 10, the spring 72 maintains the member 68 in engagement with the abutment 74. Movement of the actuating rod 66 therefore pivots the lever means 58 about the pivot 62 to shift the spool valve 44 the small distance to the left, viewing FIG. 1. Movement of the spool valve terminates communication between the cavity 52 and the cavity 48 and initiates fluid communication between the cavity 50 and the cavity 52. Fluid is therefore communicated into the chamber 38 through the passages 54 and 56 to shift the piston assembly 24 to the left, therefore, applying the vehicle's brakes. It should be noted that during a normal hydraulic brake actuation, the portion 42 of the piston assembly 24 is maintained in engagement with the shoulder 34 to prevent fluid communication through the passages 36, thereby permitting fluid pressure in the chamber 38 to shift the piston assembly 24.

Figure 2:
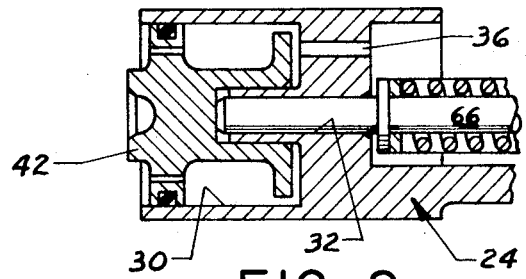
FIG. 2 is a detail view of the piston assembly used in my brake booster with the parts thereof illustrated in the positions that they occupy after a manual brake application has been initiated.

Although the brake booster 10 is quite reliable, occasionally the spool valve 44 will malfunction in such a manner that it will not move when the operator actuates the actuating rod 66. When this occurs, the actuating rod 66 moves relative to the piston assembly 24 until the end 64 of the rod 66 engages the portion 42 of the piston assembly 24. Thereafter, further movement of the actuating rod 66 moves the portion 42 to the left viewing the figure, forcing the portion 42 away from the passages 36, as is illustrated in FIG. 2. Since the portion 42 is connected to the master cylinder (not shown) by the rod 76 movement of the portion 42 by the rod 66 actuates the vehicle's brakes in the normal manner; however, a much greater operator-applied force is required for manual actuation than is required for the normal hydraulic actuation. Movement of the portion 42 away from the shoulder 34 when the brakes are applied manually also permits fluid communication between the chambers 38 and 40 through the passages 36 in the shoulder 34 and through corresponding passage 78 in the portion 42. If the spool valve 44 should suddenly move after a manual brake application has been initiated, thereby admitting high pressure fluid into the chamber 38, this fluid will be vented through the passages 36 and 78 into the chamber 40. This feature prevents the vehicle's brakes from being applied abruptly by the pressurized fluid after initiation of the manual brake application, thereby preventing damage to the vehicle or its occupants. When the chamber 40 is filled with fluid, any excess escapes through the passage 80 into the cavity 48 and then through the exhaust port 18 to the reservoir (not shown). This feature also insures that any fluid escaping past the seals between the piston assembly 24 and the wall of the bore 26 will not escape from the vehicle's hydraulic system, but instead will eventually be returned to the system's fluid reservoir (not shown).

I claim:

1. In a hydraulic boost device:
a housing defining a bore therewithin;
a piston slidable in said bore dividing the latter into a pair of chambers on opposite sides of the piston;
first valve means for admitting pressurized fluid into one of said chambers for moving said piston toward one end of the bore;
operator-actuated means for operating said valve means;
said operator-actuated means including other means for engagement with the piston when said valve means malfunctions to permit the operator to move the piston toward said one end of the bore; and
second valve means within said piston;
said other means opening said second valve means when said first valve means malfunctions to permit fluid communication between said first and second chambers.

2. In a hydraulic boost device:
a housing defining a bore therewithin;
a piston slidable in said bore dividing the latter into a pair of chambers on opposite sides of the piston;
valve means for admitting pressurized fluid into one of said chambers for moving said piston toward one end of the bore;
operator-actuated means for operating said valve means;
said operator-actuated means including other means for engagement with the piston when said valve means malfunctions to permit the operator to move the piston toward said one end of the bore;
said piston having first and second portions;
passage means extending through one of said portions to permit fluid communication between said chambers;
the other portion normally closing said passage means to permit fluid pressure to move said piston;
said other means engaging said other portion when said valve means malfunctions to open said passage means thereby permitting fluid communication between the chambers through said passage means.

3. The invention of claim 2; and
resilient means yieldably urging said second portion toward a position closing said passage means.

4. The invention of claim 2; and
resilient means yieldably urging said second portion into engagement with said first portion and thereafter urging said piston as a unit toward the other end of the bore.

5. The invention of claim 3:
one of said portions having an annular wall defining a second bore therewithin;
said second bore being stepped to present larger and smaller diameter portions with a shoulder therebetween;
said passage means being openings extending through said shoulder;
the other portion being slidable in said larger portion of said second bore toward and away from a position closing said openings.

6. The invention of claim 5:
said other means being a rod slidably supported in the smaller portion of said second bore;
said rod engaging said other portion to force the latter away from said openings to permit fluid communication through the latter after said valve means malfunctions after operation of the operator-actuated means.

7. The invention of claim 6; and
fluid pressure generating means operatively connected to said housing;
said other portion being operatively connected to said fluid pressure generating means for operating the latter upon movement of the piston toward said one end of the bore.

8. The invention of claim 2:
said housing defining an elongated compartment therewithin;
said valve means being a spool valve slidably mounted in said compartment and cooperating with the walls thereof to define a first cavity in fluid communication with a source of pressurized fluid and a second cavity in fluid communication with a reservoir, said valve means being moved by said operator-actuated means from a first position communicating said one chamber with said second cavity to a position communicating said one chamber with said first cavity to permit fluid communication into said one chamber for shifting said piston; and passage means communicating the other chamber with said second cavity.

9. The invention of claim 8:

said operator-actuated means including lever means pivotally connected to said piston and to said spool valve and an operator-actuated rod operatively connected to said lever means for pivoting the latter to shift the spool valve to the second position, said rod being movable relative to said lever means to engage said other portion to shift the latter to a position permitting fluid communication through said passage means.

References Cited

UNITED STATES PATENTS

| | | | |
|---|---|---|---|
| 2,069,214 | 2/1937 | Carlson | 91—437 |
| 3,060,895 | 10/1962 | Acker et al. | 91—437 |
| 3,075,499 | 1/1963 | Prather | 91—391 |
| 3,173,339 | 3/1965 | Larsen | 91—391 |

FOREIGN PATENTS

| | | | |
|---|---|---|---|
| 1,105,351 | 3/1968 | Great Britain | 91—391 |

PAUL E. MASLOUSKY, Primary Examiner

U.S. Cl. X. R.

91—422, 437